(12) United States Patent
Röhrig et al.

(10) Patent No.: US 8,834,669 B2
(45) Date of Patent: Sep. 16, 2014

(54) METHOD FOR THE AT LEAST PARTIAL CONNECTING OF WALLS OF AN ELASTIC HOLLOW BODY AND HOLLOW BODY

(75) Inventors: Peter Röhrig, Vienna (AT); Thomas Rohaczek, Vienna (AT)

(73) Assignee: Mam Babyartikel Gesselschaft m.b.H., Vienna (AT)

( * ) Notice: Subject to any disclaimer, the term of this patent is extended or adjusted under 35 U.S.C. 154(b) by 633 days.

(21) Appl. No.: 13/058,704

(22) PCT Filed: Sep. 10, 2010

(86) PCT No.: PCT/AT2010/000326
§ 371 (c)(1),
(2), (4) Date: Apr. 1, 2011

(87) PCT Pub. No.: WO2011/029116
PCT Pub. Date: Mar. 17, 2011

(65) Prior Publication Data
US 2011/0177270 A1 Jul. 21, 2011

(30) Foreign Application Priority Data

Sep. 11, 2009 (AT) .................................. 1444/2009

(51) Int. Cl.
*B29C 65/00* (2006.01)
*B29C 65/02* (2006.01)
(Continued)

(52) U.S. Cl.
CPC ................ *B29C 65/18* (2013.01); *B29C 65/00* (2013.01); *B29C 65/026* (2013.01); *B29C 66/1122* (2013.01); *B29C 66/30223* (2013.01); *B29C 66/3242* (2013.01); *B29C 66/71* (2013.01); *B29C 66/919* (2013.01); *B29C 66/949* (2013.01); *B29L 2022/00* (2013.01); *B29L 2022/025* (2013.01); *B29L 2031/703* (2013.01); *B29L 2031/7496* (2013.01); *B29K 2995/0046* (2013.01); *B29C 65/4815* (2013.01); *B29C 65/483* (2013.01); *B29C 65/542* (2013.01); *B29C 66/004* (2013.01); *B29C 66/43121* (2013.01); *B29C 66/49* (2013.01); *B29C 66/7315* (2013.01); *B29C 66/73754* (2013.01); *B29C 66/8322* (2013.01); *B29C 65/02* (2013.01)
USPC ........... 156/308.2; 156/60; 264/248; 264/261

(58) Field of Classification Search
USPC .......................... 156/308.2, 60; 264/248, 261
IPC ................................ B29C 65/00,65/02, 65/026
See application file for complete search history.

(56) References Cited

U.S. PATENT DOCUMENTS

| 1,289,777 | A | 12/1918 | Mahoney |
| 3,923,067 | A | 12/1975 | Hurst |
| 2002/0173698 | A1 | 11/2002 | Morningstar |

FOREIGN PATENT DOCUMENTS

| AT | 506 295 A4 | 8/2009 |
| EP | 0 478 167 A2 | 4/1992 |

(Continued)

OTHER PUBLICATIONS

International Preliminary Report on Patentability mailed Mar. 22, 2012; International Appln. No. PCT/AT2010/000326.

(Continued)

*Primary Examiner* — Michael C Miggins
(74) *Attorney, Agent, or Firm* — Ladas & Parry LLP

(57) ABSTRACT

A method for the at least partial connecting of walls of a hollow body of an elastic material with at least one opening, wherein a connecting material is introduced in viscous form into the opening of the pre-formed hollow body, the walls of which form a cavity, between two wall sections or surfaces of the wall sections facing each other are melted on for the purpose of the formation of a viscous connecting material, and then the connecting material is transferred into an elastic state with chemical or physical linking with the surfaces of the hollow body, so that the wall sections of the hollow body are at least partially connected with each other in the region of the connecting material, and a corresponding hollow body.

15 Claims, 8 Drawing Sheets

Figure 1:
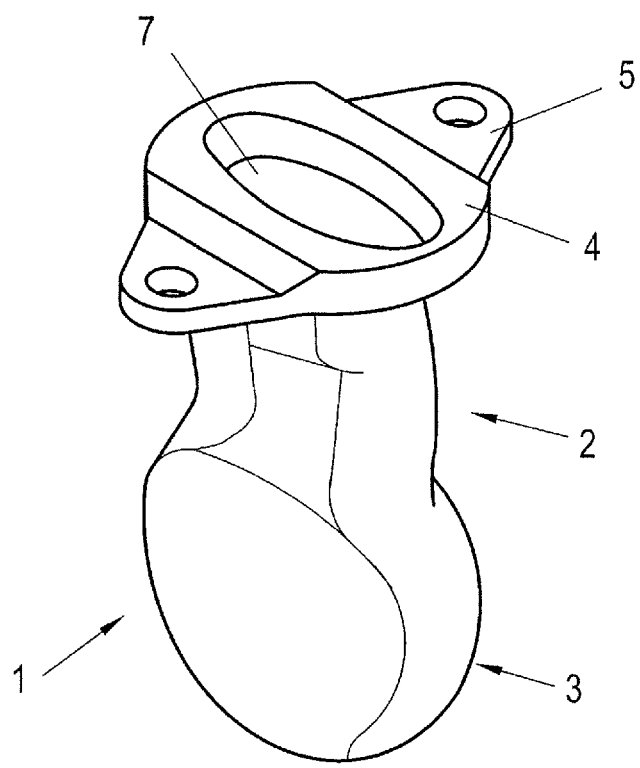

(51) Int. Cl.
*B29C 65/18* (2006.01)
*B29C 65/48* (2006.01)
*B29C 65/54* (2006.01)
*B29L 22/00* (2006.01)
*B29L 22/02* (2006.01)
*B29L 31/00* (2006.01)

(56) References Cited

FOREIGN PATENT DOCUMENTS

| EP | 1 086 804 | A2 | 3/2001 |
| FR | 1 119 283 | A | 6/1956 |
| GB | 2 192 549 | A | 1/1988 |
| JP | 9-267392 | A | 10/1997 |
| WO | 02/091954 | A2 | 11/2002 |

OTHER PUBLICATIONS

International Search Report: PCT/AT2010/000326.
Austrian Search Report.
EPO Office Communication dated Feb. 21, 2014; Appl. No. 10 760 215.3-1706 (Google Machine Translation).
Australian Government Patent Examination Report No. 2; Date of Issue Mar. 10, 2014; Appln. No. 2010292955.
Chinese Office Action dated Dec. 27, 2013; Appln. No. 201080051226.4.

METHOD FOR THE AT LEAST PARTIAL CONNECTING OF WALLS OF AN ELASTIC HOLLOW BODY AND HOLLOW BODY

The invention relates to a method for the at least partial connecting of walls of a hollow body of an elastic material with at least one opening, and a hollow body of an elastic material, wherein the walls of the hollow body, forming a cavity, are at least partially connected with each other in a connecting region.

In order to produce a completely closed hollow body or to at least partially close an opening of a hollow body, it is necessary to connect the walls of the hollow body at least partially with each other. It is particularly known here to glue the wall sections to each other. However, a glueing of the wall sections of an elastic hollow body is disadvantageous for a great variety of applications, in particular in so far as the hollow body is stressed under tension, because the hollow body then has a different elasticity in the glued area from the remaining hollow body, so that with a stress under tension or expansion, usually the adhesion sites easily detach themselves from each other unintentionally.

In order to produce a balloon-shaped medical implant, it is basically known from US 2002/0173698 to immerse a valve device several times into a silicon bath. Hereby, the valve device, which preferably consists of the same material as the material of the silicon bath, is surrounded by a balloon which is connected with the valve device by chemical cross-linking.

Further, from GB 2 192 549 A a baby pacifier is known which is substantially filled with silicon rubber. The silicon rubber which is used as filling material has a lower hardness than the silicon rubber of the cover.

The aim of the present invention, however, is to provide a method or a hollow body in which the wall sections are at least partially connected with each other such that an unintentional detaching of the wall sections from each other is prevented, in particular even when the hollow body is stressed under tension in the connecting region of the two wall sections.

This is achieved according to the invention by a method of the type mentioned in the introduction, in which a connecting material in viscous form is introduced between two wall sections into the opening of the pre-formed hollow body, the walls of which form a cavity, or surfaces of the wall sections facing each other are melted on for the purpose of forming a viscous connecting material, and then the connecting material is transferred into an elastic state under chemical or physical linking with the surfaces of the hollow body, so that the wall sections of the hollow body are at least partially connected with each other in the region of the connecting material. Through the introduction of a viscous connecting material, i.e. in particular a non-cross-linked rubber, preferably a silicone rubber, or a molten thermoplastic elastomer (TPE) or—in the case of a thermoplastic elastomer—the partial melting on of the wall sections themselves, the viscous connecting material then connects itself in the case of a (silicone) rubber material under chemical cross-linking with the elastic surfaces of the hollow body or through the formation of physical linking points in thermoplastic elastomers—in contrast to a glueing—an intimate connection of the two wall sections is brought about, which remains undetachable in particular in the case of a stressing under tension or expansion. Depending on the material from which the prefabricated hollow body consists, the wall sections in the case of a silicone, rubber or latex material are therefore vulcanized together; in the case of a thermoplastic elastomer, on the other hand, the type of connection of the two wall sections corresponds substantially to a welding. The hollow body, the wall sections of which are at least partially connected with each other, can be used for the most varied of purposes after connection of the wall sections. In particular, it is possible here to use such hollow bodies as a suction element of a pacifier, as a pump element or suction pump, bellows, actuator, pressure-equalization bladder or -bellows, suction aid, as a pipette, dosing aid, elastic and damping element, float or for example covering for the purpose of impact protection.

In order to accelerate the connecting processes or the transition of the connecting material from the viscous state into the elastic state, it is advantageous if the hollow body is heated. A heating of the hollow body can be achieved in a simple manner when the hollow body is inserted into a cavity of a mould which is pre-heated to a temperature of between 140° C. and 240° C., in particular of 200° C.

In order to keep small the total width, i.e. wall thickness, of the wall sections which are to be connected with each other, or to achieve a reliable connection between the viscous connecting material and the wall sections of the hollow body, it is advantageous if the wall sections of the hollow body are brought close or pressed to each other in the connecting region, forming a gap between the wall sections, before the viscous connecting material is introduced into the gap.

For the purpose of an intimate connection of the two wall sections, raised wall sections can lie partially against each other in the region of the gap, i.e. in the connecting region the gap is not formed continuously, but rather sections are provided in which the wall sections lie directly against each other. In so far there is no aim for the wall sections to lie partially against each other in the connecting region, such raised wall sections can of course be eliminated entirely in the connecting region.

When the gap has a height or thickness of between 10% and 80%, in particular of approximately 40%, of the total thickness of the hollow body in the connecting region, advantageously a connecting region of relatively small wall thickness is achieved.

As regards time, it is advantageous if the wall sections are brought close or pressed to each other for between 3 s and 120 s for transition of the connecting material from the viscous state into the elastic state, wherein the time for pressing or bringing close is dependent on the type of material and the wall thickness of the hollow body in the connecting section.

In order to ensure a clear separation between the connected wall sections and the part of the hollow body which is also formed as a cavity after the partial connection of the wall sections, it is advantageous if preferably web-shaped wall sections are pressed against each other in a sealing region adjoining the connecting region, such that an entry of the viscous connecting material into the cavity adjoining connecting region is prevented.

It has proved to be advantageous here if during the introduction of the viscous connecting material the wall thickness of the hollow body is reduced in the sealing region to at least 60% of the wall thickness before the connecting of the wall sections.

A particularly intimate connecting of the wall sections, so that even in section a connection or connecting seam is scarcely visible, is guaranteed when a material is used as connecting material which has substantially the same chemical structure as the material of which the hollow body consists. Therefore, after the connecting of the two wall sections, substantially a single-piece wall section is the result.

When a linear element, running from the opening into the cavity, is inserted into the hollow body, before the two wall sections are connected with each other, in a simple way a channel is formed in the connecting region, which can be used for example as a ventilation or suction channel.

In order to provide an outer element, firmly connected with the hollow body, e.g. a handle, a shield, or suchlike, it is advantageous if, at the same time as the connecting of the wall sections, an element arranged outside the hollow body, in one piece with the connecting material, is formed.

The hollow body of the type mentioned in the introduction is characterized in that surfaces of the walls which are connected with each other are linked with each other chemically or physically. Through the chemical or physical linking of the surfaces of the walls directly with each other or by means of a connecting material, a particularly reliable connection is produced which is indetachable in particular also in the case of tensile stresses. It is particularly advantageous here if in the connecting region of the two walls a connecting material is provided, which has substantially the same chemical structure as the material of the hollow body.

When the inner surface at least of one wall of the hollow body has at least one raised spacer in the connecting region, the connecting wall sections can be pressed to each other in a simple manner, so that over a large portion between the two inner surfaces a gap is formed, which is only interrupted in the region of the spacers. Alternatively, the wall sections can also be brought close to each other without spacers, with the formation of a gap.

In order to reliably prevent viscous connecting material from penetrating from the connecting region into the region of the hollow body which forms the cavity, it is advantageous if the inner surface at least one of wall has a raised web with respect to the remaining surface of the wall, substantially separating the connecting region from the cavity.

In so far as the hollow body is to have a channel leading to the opening, it is advantageous for the purpose of forming an opening of the channel into the cavity, if the web has at least one depression. In so far as at least one channel is provided in the connecting region, connecting the cavity with the opening, the finished hollow body can be used for the most varied of purposes, e.g. as a suction element of a pacifier, suction pump, actuator, pipette, etc.

In order to prevent the region of the cavity adjoining the channel from closing the channel in an air-tight manner, so that a pressure equalization would not be possible, it is advantageous if the inner surface, in particular adjacent to an opening of the channel into the cavity, has an elevation in the region of the cavity. Through the provision of such an elevation, it is ensured that the two walls of the hollow body can not lie on each other in a laminar manner in the opening region of any channel; it is thereby guaranteed that the elastic hollow body can relax into its relaxed initial position due to a pressure equalization.

In addition, to increase the elastic restoring power of the hollow body, it is expedient if the wall in the region of the cavity has at least partially a greater wall thickness than in the connecting region, in particular in the section adjoining the connecting region.

In order to be able to use the hollow body for the most varied of purposes, an element, e.g. a shield, a handle element, etc., which is formed in one piece with the connecting material, can be provided outside the hollow body. The outer element here can have a different colour, rigidity etc. compared with the hollow body, wherein thereby a single-piece 2-component element comprising the hollow body is provided.

For the most varied of purposes of application, e.g. use of the hollow body as a suction element or pipette, it is advantageous if substantially a bulbous cavity is provided, to which a shaft-shaped connecting region with the opening adjoins. In the case of a (pacifier) suction element, the bulbous cavity is used as a suction body, wherein advantageously through the connecting of the two wall sections in the shaft-shaped connecting region, the pacifier shaft can have a smaller wall thickness compared with conventional hollow body suction arrangements, in which the wall sections are not partially connected with each other. When a pacifier shield is constructed with the material provided in the shaft-shaped connecting region, a non-detachable connection can be achieved, simply in the manner of a two-component embodiment, between the hollow body formed as a suction part and the shield, delimiting the insertability of the suction part into the mouth cavity. Depending on the use of the hollow body according to the invention, it is advantageous if the hollow body and the connecting material consist of an elastomer, in particular silicone, a thermoplastic elastomer (TPE), or latex.

Figure 2:
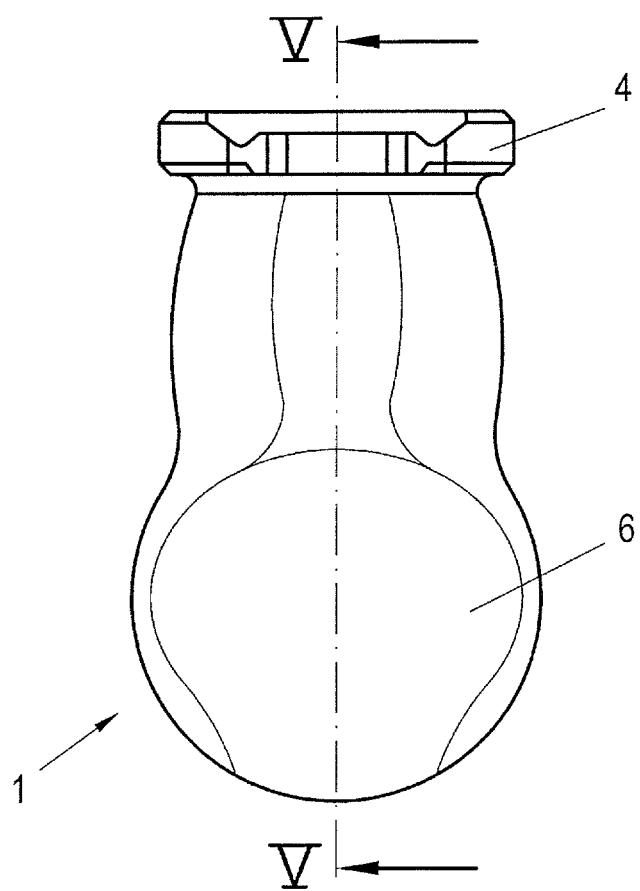
Figure 3:
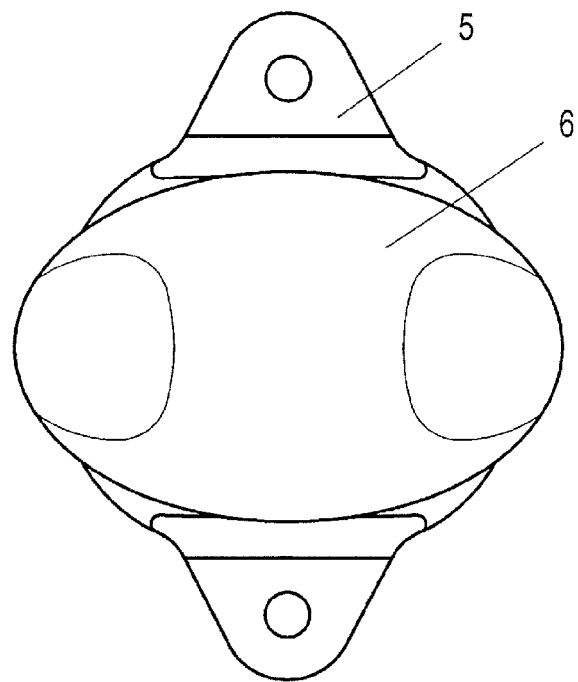
Figure 4:
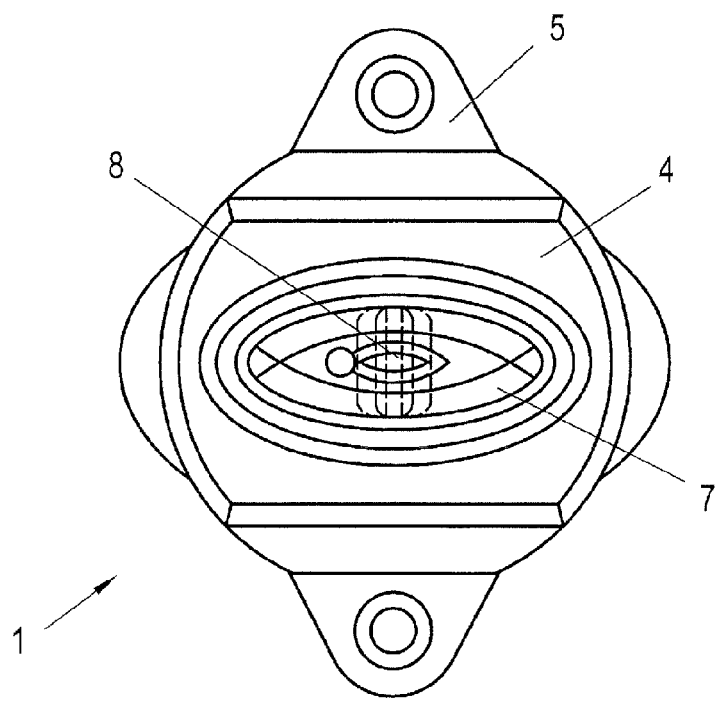
Figure 5:
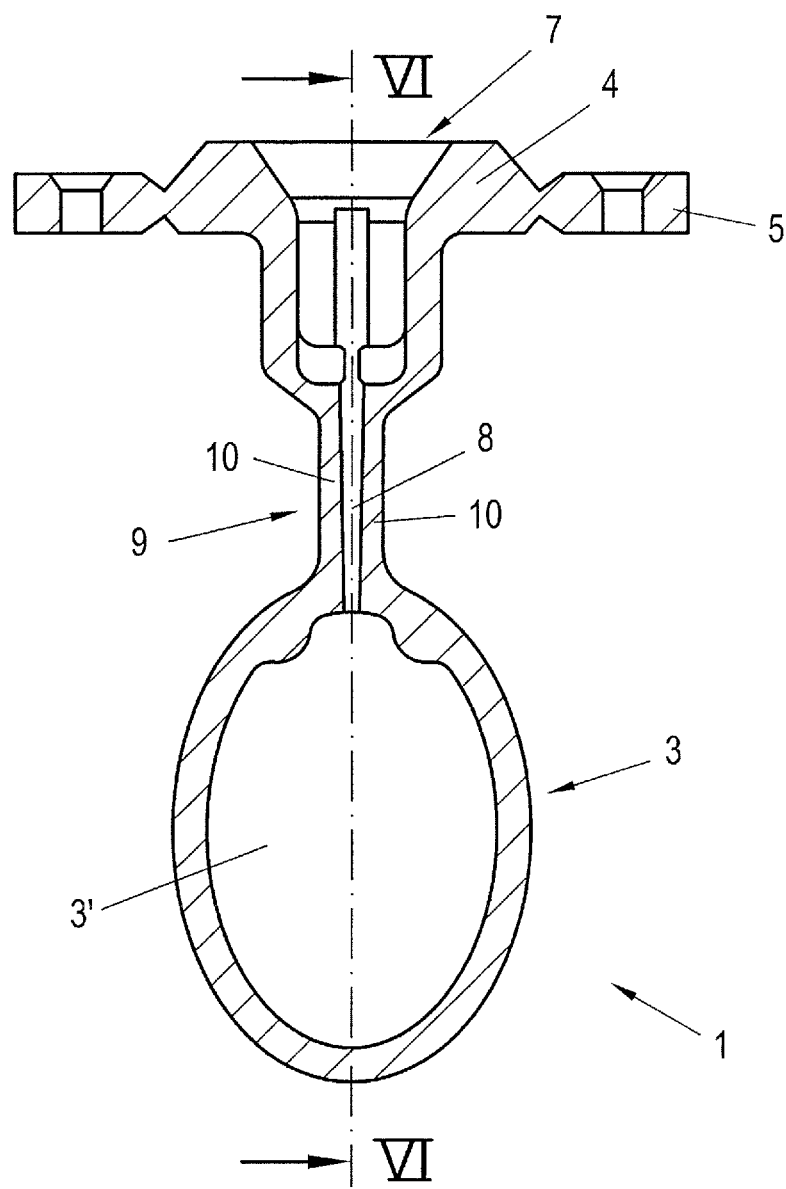
Figure 6:
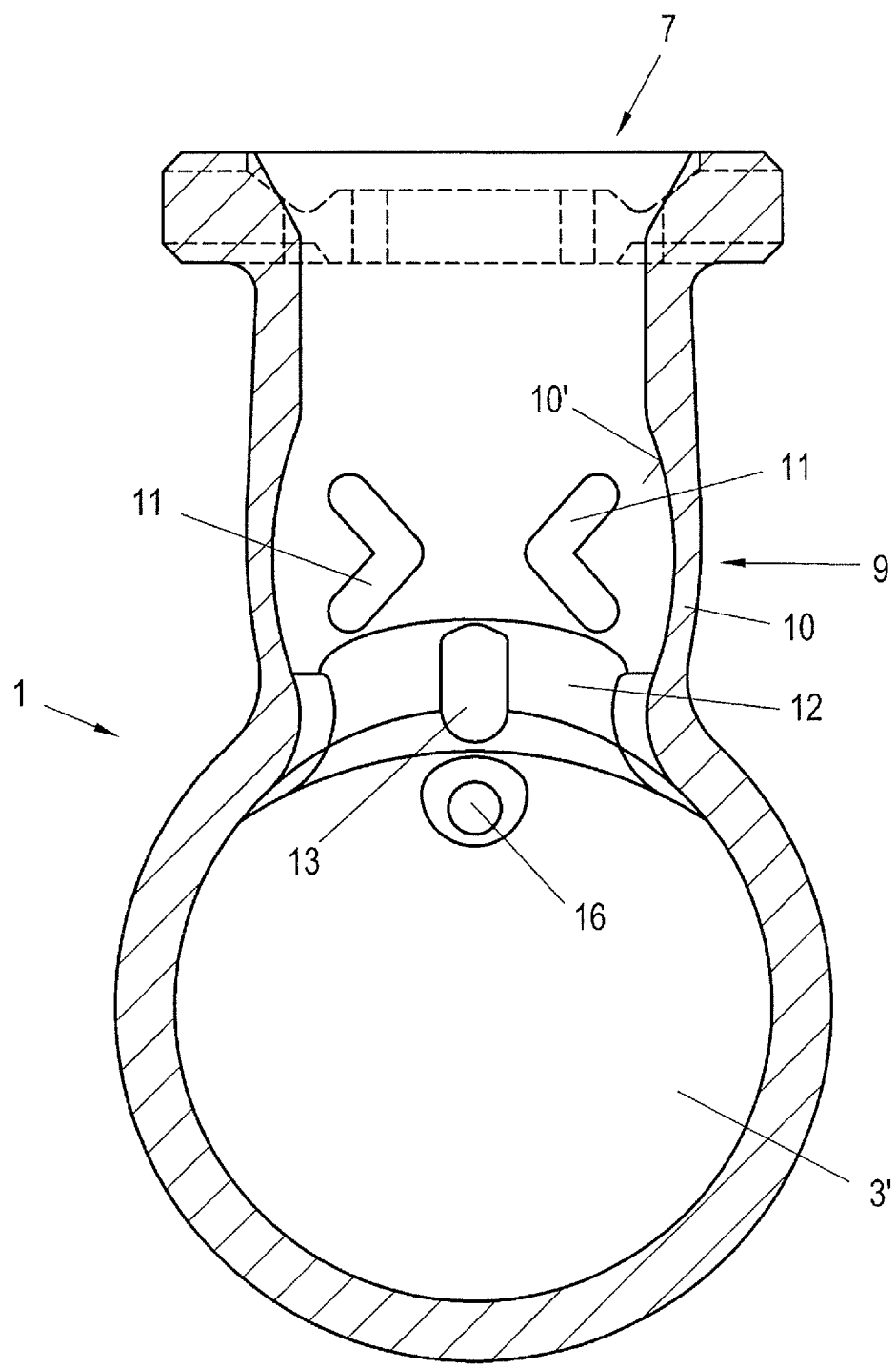
Figure 7:
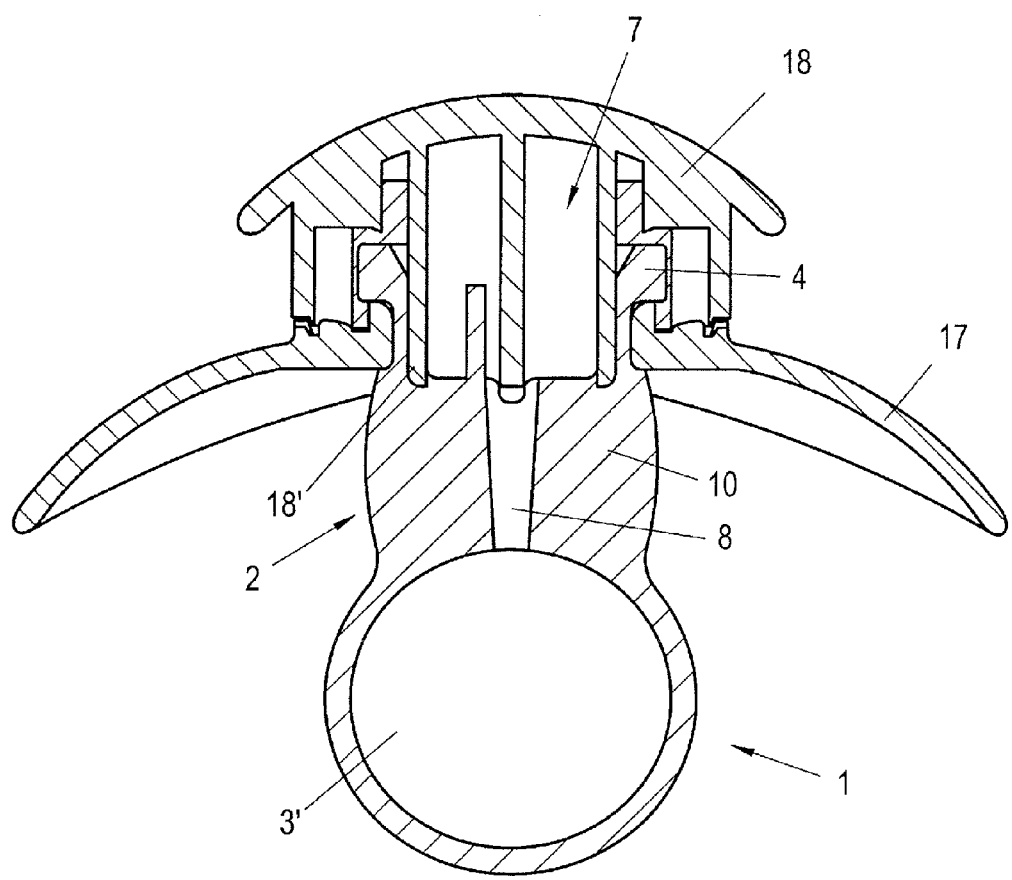
Figure 7A:
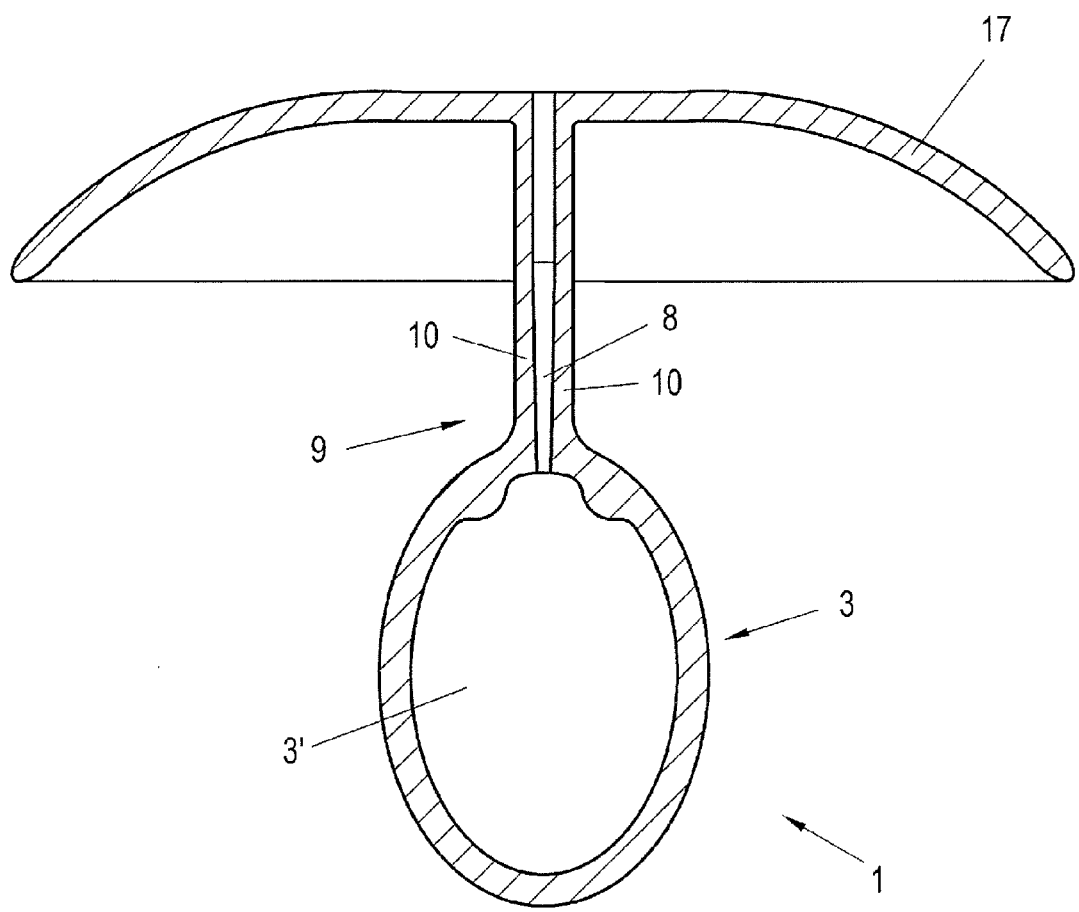
Figure 8:
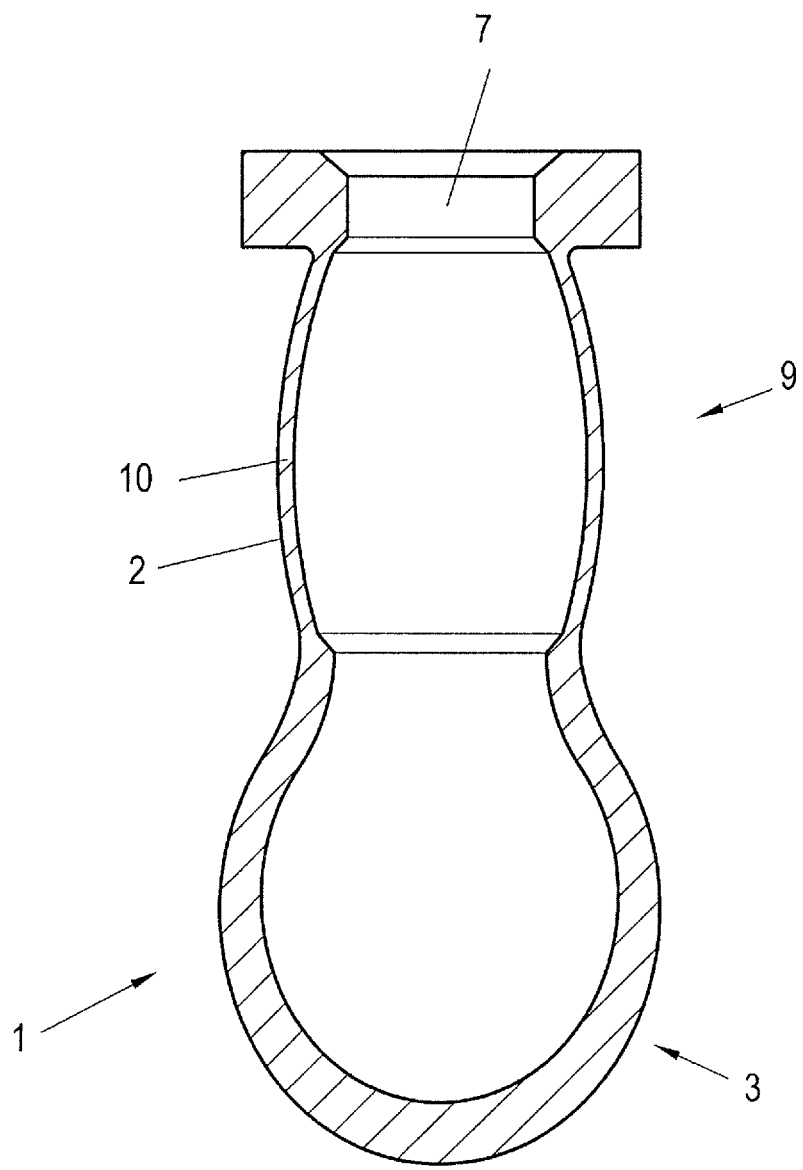
Figure 10:
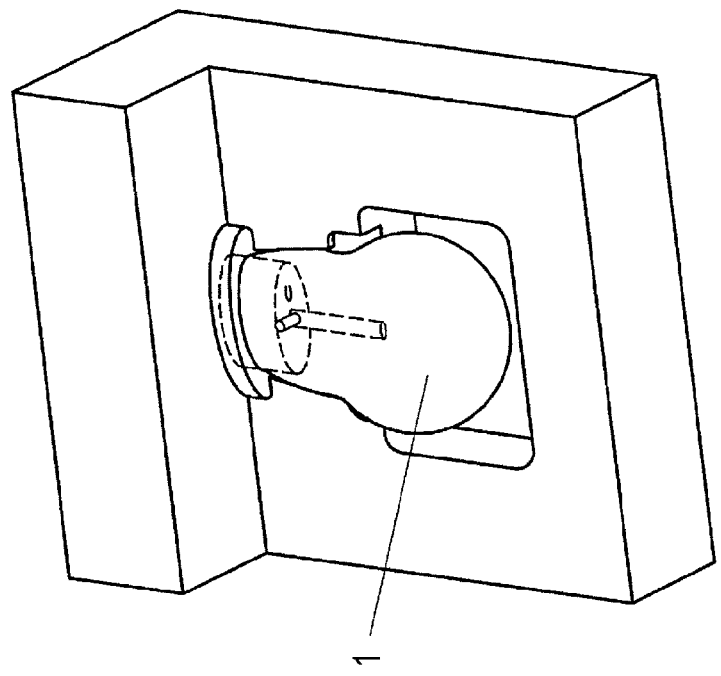
Figure 9:
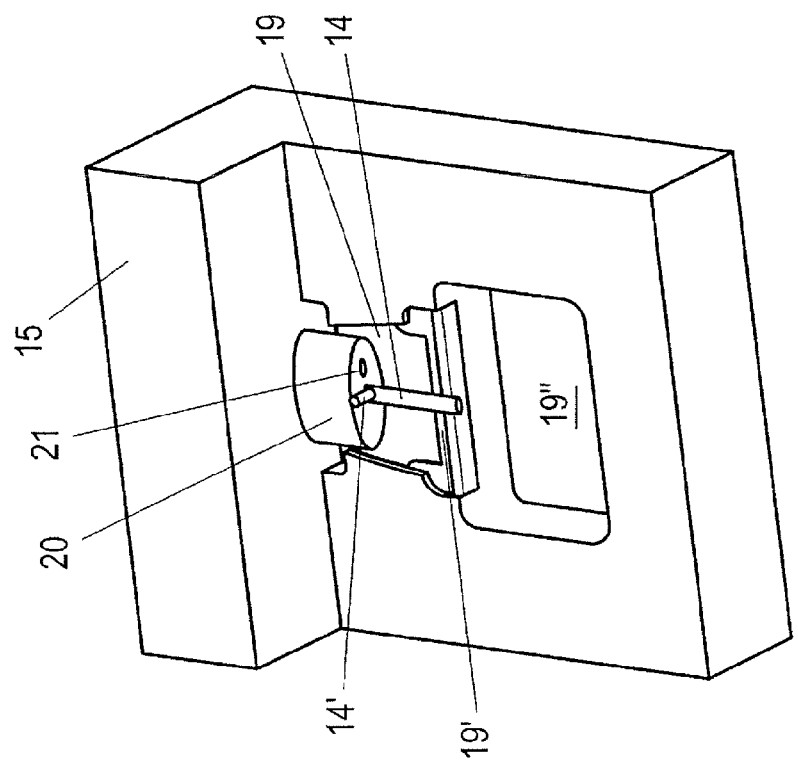

The invention is explained in detail below with the aid of a preferred example embodiment, to which, however, it is not to be restricted. In detail, there are shown in the drawings:

FIG. 1 a perspective view of a suction element;

FIG. 2 a view of the suction element according to FIG. 1;

FIG. 3 a top view onto the tip of the suction element according to FIG. 2;

FIG. 4 a top view onto the shaft of the suction element according to FIG. 2;

FIG. 5 a section according to line V-V in FIG. 2;

FIG. 6 a section according to line VI-VI in FIG. 5;

FIG. 7 a section view of a suction element connected with a pacifier shield piece;

FIG. 7a a section view similar to FIG. 7, wherein the pacifier shield is formed in one piece with the suction element;

FIG. 8 a section view of a pre-formed hollow body with wall sections not yet connected;

FIG. 9 a perspective view of a device for connecting the wall sections in the shaft region of the suction element; and FIG. 10 the perspective view of the device with an inserted suction element.

In FIGS. 1 and 2 a hollow body 1 is shown, formed as a suction element, with an opening 7 provided in the shaft region 2. The shaft region 2 adjoins here a bulbous suction body 3, formed so as to be substantially closed, with a cavity 3'. On the end side, the shaft region 2 has a flange 4 on which triangular flange projections 5 are formed. The flange projections 5 make it possible in particular to remove the hollow body 1, after it has been pre-formed, precisely positioned from an injection mould and to insert in a simple manner the hollow body 1, produced as a preform, for the connection of wall sections 10, into a mould 15 (cf. FIGS. 9 and 10). The hollow body 1 can have different surface properties, wherein as illustrated in the drawings, in particular in the region of the outer surface of the bulbous suction body 3, a roughened surface structure 6 can be provided, wherein here the averaged roughness depth $R_z$ is preferably between 10 µm and 50 µm. The surface roughness zone 6 extends here continuously over the tip of the suction element 1, as can be seen in particular in FIG. 3.

In FIG. 4 in the flange region the comparatively large opening 7 can be seen, which is provided for mounting on a pacifier shield 17 (cf. FIG. 7). In other uses, e.g. as suction pump, pipette or suchlike, this cross-section-sized opening can, of course, be dispensed with or can be constructed smaller. In addition, it can be seen in FIG. 4 that a channel 8 opens in the opening 7.

As shown in FIG. 5, the channel 8 extends from the cavity 3' over a connecting region 9, which coincides substantially with the shaft 2. In the connecting region 9, the wall sections 10 of the hollow body 1—apart from the channel 8—are connected with each other. The channel 8 therefore produces a connection from the cavity 3' into the cross-sectionally larger opening 7 or the environment, so that a pressure equalization can take place reliably between the cavity 3' of the hollow body 1 and the environment.

In the section view according to FIG. 6 it can be seen that the suction element 1 has a smaller wall thickness in the connecting region 9 than in the region of the suction body 3; preferably, the wall thickness in the connecting region is between 0.6 mm and 1.2 mm. In addition, in the region of the cavity 3' adjoining the connecting region an increased wall thickness is provided (cf. also FIG. 5), so that the suction body 3 has a certain form stability and it is therefore ensured that after compression it returns into its initial position.

In addition, spacer elements 11 can be seen, via which it is ensured that on compressing of the wall sections 10, in the connecting region 9 a gap remains between the inner surfaces 10', in which an elastic connecting material, in particular silicone, introduced via the opening 7, can be distributed before the transition into an elastic final state in the connecting region 9. In so far as the inner surfaces of the wall sections 10 are not, however, pressed to each other in the connecting region 9, but rather are merely brought close to each other in a mould such that between the inner surfaces the desired gap width is achieved to receive the viscous material for the purpose of connecting the wall sections 10, the spacer elements 11 can be dispensed with entirely.

In order to prevent viscous connecting material from penetrating into the cavity 3', a raised web 12 is provided, which separates the connecting region 9 from the cavity 3'. The web 12 has a depression 13 here, in which a pin 14 of a mould 15 comes to lie during the introduction of the viscous connecting material (cf. FIGS. 9 and 10), so that it is ensured that no viscous connecting material can penetrate into the interior of the cavity 3' via the depression 13. At the same time, the duct 8 is formed by the pin 14 of the mould 15, said duct therefore opening in the depression 13 of the web 12; hereby, after uniting of the wall sections 10, a pressure equalization is reliably possible between the cavity 3' and the environment.

Adjacent to the depression 13, which forms at the same time the opening of the duct 8 into the cavity 3', a wart-shaped elevation 16 is provided on the inner surface of the cavity 3'. Hereby, it is ensured that on compressing of the cavity 3' the walls of the cavity 3' do not close off the depression 13 or channel 8 in an air-tight manner, whereby a pressure equalization would be impossible. Therefore, through the elevation or the projection 16, a pressure equalization is reliably guaranteed.

In the section view according to FIG. 7 it can be seen that the shaft 2, formed with one wall in the shaft region 2 after the connecting of the two wall sections 10, is able to be mounted in a conventional manner on a pacifier shield 8. For this, a fastening element 18 is provided which is known per se and which penetrates with a conical projection 18' into the cross-sectionally larger opening 7 of the hollow body 1, wherein the shaft 2 or the flange 4 is then received in a form- and force-fitting manner between the pacifier shield 17 and the fastening part 18. As the channel 8 remains open in the connecting region with the pacifier shield 17 or the fastening part 18, a ventilation from the cavity 3' and a pressure equalization with the environment are possible in a reliable manner.

In FIG. 7a an alternative example embodiment is shown, in which an element 17', provided outside the hollow body 1, is embodied in the form of the shield 17 in one piece with the connecting material provided in the connecting region 9. As the connecting material has substantially the same chemical structure as the material of the hollow body 1, advantageously a reliable, non-detachable connection of the shield 17 to the hollow body 1 is produced. As the connecting material in addition can have a totally greater hardness than the material of the hollow body 1, at the same time—if desired—a shield 8 can be formed which has a greater rigidity compared with the hollow body 1.

In FIG. 8 the pre-formed hollow body 1 is shown, with a bulbous cavity 3' or respectively suction body 3 and a shaft region 2 in which an opening 7 is provided, wherein here the wall sections 10 in the shaft region 2 are not yet connected with each other. In particular, it can also be seen that the wall thickness in the connecting region 9 or shaft region 2 is smaller than that in the region of the suction body 3. After the wall sections 10 are connected with each other, the total of the two wall thicknesses in the shaft region 2 is therefore less than in conventional hollow body suction arrangements.

In FIGS. 9 and 10 the mould 15 is shown for the connecting of the wall sections 10 of the hollow body 1; here the mould 15, which is usually pre-heated to approx. 180—220° C., has a cavity 19 to receive at least one section of the hollow body 1. The hollow body 1 is placed here with an opening 7 on a base 20 which is substantially elliptical in cross-section, to which adjoin the pin 14 for the formation of the channel 8 and a pin 14' for the formation of a transverse channel for the purpose of connecting to an air channel in the fastening part 18. In the region of the shaft 2, the cavity 19 is formed such that on placement of an upper mould part, the wall sections 10 are brought close to each other in the connecting region 9, with the formation of a gap of in particular approx. 0.9 mm. At the end of the shaft, the cavity 19 has a raised web 19', so that the wall sections 10 are pressed to each other in a sealing region adjoining the connecting region 9, whereby an entry of the viscous connecting material into the cavity 3' is avoided. A depressed cavity 19" to receive the suction body 3, forming the cavity 3', adjoins the web 19'.

After a corresponding upper part of the mould 15 was been put in place, in order to bring the wall sections 10 close to each other in the connecting region 9, with the formation of a free gap with a width of approx. 0.3 to 1.5 mm, in particular approx. 0.9 mm, and to reduce the wall thickness of the wall sections 10 in the sealing region to at least approx. 60%, viscous connecting material 21 can be introduced into the connecting region 9 via an injection opening 21. This is the same material, with regard to chemical structure, as that from which the hollow body 1 is produced, i.e. in the case of a suction element, preferably a silicone material, with the material, of course, being able to have a different Shore hardness, colour, etc.

The silicone, which is introduced substantially at room temperature into the gap between the two wall sections 10 of the hollow body 1 in the connecting region 9, then remains for approx. 20 s at approx. 220° C., so that it cross-links chemically with the wall sections 10 and is transferred into an elastic state. The two wall sections 10 are therefore connected with each other in the most intimate manner in the connecting region 9, so that in particular also in the case of tensile stresses, there is no risk of detachment of the two wall sections 10 from each other.

Of course, any hollow bodies 1 can be connected with each other partially in an opening region by means of such a method, so that hereby the production of the most varied objects is possible, for example of pump elements, actuators, suction aids, pipettes, pressure-equalizing bladders, dosing aids, elastic- and damping elements, floats and impact protection coverings and suchlike.

The invention claimed is:

1. A method for the at least partial connecting of walls of a hollow body of an elastic material with at least one opening, comprising:

introducing into the opening of the pre-formed hollow body, the walls of which form a cavity, a connecting material in viscous form between two wall sections or surfaces of the wall sections facing each other are melted on for the purpose of forming a viscous connecting material, and then the connecting material is transferred into an elastic state under chemical or physical linking with the surfaces of the hollow body, so that the wall sections of the hollow body are at least partially connected with each other in the region of the connecting material, wherein a linear element, running from the opening into the cavity, is placed into the hollow body before the two wall sections are connected with each other.

2. Method according to claim 1, wherein the wall sections are brought close or pressed to each other for between 3 s and 120 s for the transfer of the connecting material from the viscous into the elastic state.

3. Method according to claim 1, wherein as connecting material, a material is used having substantially the same chemical structure as the material of which the hollow body consists.

4. Method according to claim 1, wherein simultaneously with the connecting of the wall sections, an element is formed which is arranged outside the hollow body and is in one piece with the connecting material.

5. Method according to claim 1, wherein the hollow body is heated.

6. Method according to claim 5, wherein the hollow body is placed into a cavity of a mould, which is pre-heated to a temperature of between 140 and 240° C.

7. Method according to claim 6, wherein the mould is pre-heated to a temperature of 200° C.

8. Method according to claim 1, wherein the wall sections of the hollow body are brought close or pressed to each other in the connecting region with the formation of a gap between the wall sections.

9. Method according to claim 8 wherein the gap has a height or thickness of between 10% and 80% of the total thickness of the hollow body in the connecting region.

10. Method according to claim 8, wherein the gap has a height or thickness of approximately 40% of the total thickness of the hollow body in the connecting region.

11. Method according to claim 1, wherein the wall sections lie partially against each other in the region of the gap.

12. Method according to claim 11, wherein the gap has a height or thickness of between 10% and 80% of the total thickness of the hollow body in the connecting region.

13. Method according to claim 11, wherein the gap has a height or thickness of approximately 40% of the total thickness of the hollow body in the connecting region.

14. Method according to claim 1, wherein preferably web-form wall sections are pressed to each other in a sealing region adjoining the connecting region, such that an entry of the viscous connecting material into the cavity adjoining the connecting region is prevented.

15. Method according to claim 14, wherein during the introduction of the viscous connecting material, the wall thickness of the wall sections in the sealing region is reduced to at least 60% of the wall thickness of the wall sections before connecting of the wall sections.

* * * * *